United States Patent Office 3,647,685
Patented Mar. 7, 1972

3,647,685
PROCESS FOR DECOLORIZING DRY CLEANING SOLVENTS
Jameel Menashi, Lexington, and Paul F. Troiano, Norwood, Mass., assignors to Cabot Corporation, Boston, Mass.
No Drawing. Filed Feb. 25, 1970, Ser. No. 14,203
Int. Cl. B01d 15/00
U.S. Cl. 210—39         6 Claims

ABSTRACT OF THE DISCLOSURE

Dry cleaning solvents are decolorized by contact thereof with certain carbon blacks. An improved process for the decolorization of dry cleaning solvents with such blacks is described.

THE PRIOR ART

Presently, dry cleaning solvents such as Stoddard's solvent, naphtha, or perchloroethylene are often decolorized by contact thereof with activated carbons produced by charring of various organic substances. In particular, chars derived from lignite presently enjoy extensive commercial usage in this application. Such chars, however, are generally relatively expensive; therefore, the discovery of an economic and effective substitute for the chars of the prior art would represent a meritorious advance in the art. In accordance with the present invention, said advance has been achieved.

OBJECTS OF THE INVENTION

It is a principal object of the invention to provide a novel process for the decolorization of dry cleaning solvents.

It is another object of the invention to provide an improved process for the decolorization of dry cleaning solvents.

It is yet another object of the present invention to provide economically attractive decolorizing agents for use in treating dry cleaning solvents.

Other objects and advantages of the present invention will in part be obvious and will in part appear hereinafter.

Other objects and advantages of the present invention will in part be obvious and will in part appear hereinafter.

GENERAL DESCRIPTION OF THE INVENTION

In accordance with the present invention it has been discovered that dry cleaning solvents are effectively decolorized by contact thereof with certain carbon blacks. Further, the decolorization efficiency of such blacks has additionally been found to be substantially enhanced when the dry cleaning solvent to be decolorized also contains dispersed or dissolved therein relatively small amounts of water.

DETAILED DESCRIPTION OF THE INVENTION

Carbon blacks suitable for use in the present invention are generally any carbon black having a BET–$N_2$ surface area of above about 180 m.$^2$/gm. and a volatile content (ASTM D–1620–60) of greater than about 3 percent. Preferably the blacks employed will have surface areas of above about 250 m.$^2$/gm. and volatile contents of between about 5 and about 10 percent.

The art of carbon black production by way of the channel and furnace processes is well known. Details of such processes may be had by reference to the following patent literature incorporated herein by reference: U.S. 2,368,827, Hanson et al., Feb. 6, 1945; U.S. 2,375,795, Krejci, May 15, 1945; U.S. 2,378,055, Wiegand et al., June 12, 1945; U.S. 2,462,026, Loving, Feb. 15, 1949; U.S. 3,413,093, Friauf et al., Nov. 26, 1968; U.S. 3,469,911, Krejci et al., Aug. 12, 1969; U.S. 3,463,612, Whitsel, Jr., Aug. 26, 1969; U.S. 3,467,502, Davis, Sept. 16, 1969; U.S. 3,475,125, Krejci, Oct. 28, 1969; U.S. 1,510,485, Lewis, Oct. 7, 1924; U.S. 2,446,351, Williams et al. Aug. 3, 1948; U.S. 2,719,078, Billings et al., Sept. 27, 1955; U.S. 3,418,085, Adams et al., Dec. 24, 1968.

Carbon blacks produced by the furnace or channel processes do not normally possess the combination of surface area and volatile content characteristics required of the carbon blacks employed in the present invention. However, such blacks can often be aftertreated by partial oxidation thereof to result in such suitable carbon blacks. Such oxidative after-treatments are also well known in the carbon black producing industry and are usually undertaken in order to impart improved scorch characteristics in blacks earmarked for use in vulcanizable rubber compositions or to impart flow characteristics to blacks intended for use as ink or paint pigments.

Presently, commercially employed oxidative after-treatments of carbon black fall generally into one of three categories, any of which are suitable in providing the blacks useful for the purposes of the present invention. In the first broad aftertreatment classification, the carbon black is heated in air. The second broadly employed oxidative after-treatment resides in contacting a carbon black with ozone at relatively low temperatures, e.g. room temperature. The third oxidative process involves the heating of a black in the presence of an oxidant compound, particularly nitric acid or nitrogen oxides. Pertinent patent literature useful in more fully describing the details of such well-known oxidative processes is: U.S. 2,013,774, Wiegand, Sept. 10, 1935; U.S. 2,420,810, Bray et al., May 20, 1947; U.S. 2,479,708, Amon, Aug. 23, 1949; U.S. 2,495,925, Foster et al., Jan. 31, 1950; U.S. 2,641,535, Cines, June 9, 1953; U.S. 2,682,448, Cines, June 29, 1954; U.S. 2,686,107, Jordan, Aug. 10, 1954; U.S. 3,023,118, Donnet, Feb. 27, 1962; U.S. 3,216,843, Heller et al., Nov. 9, 1965; U.S. 3,279,935, Daniell et al., Oct. 18, 1966; U.S. 3,398,009, Deery, Aug. 20, 1968; U.S. 3,481,754, Lewis et al., Dec. 2, 1969.

It should be noticed that carbon blacks produced by processes other than the channel or furnace processes described above are also generally suitable provided that the surface area and volatile content parameters thereof fall within the above-recited ranges. For instance, carbon blacks can be produced by subjecting carbonaceous materials to thermal decomposition, dissociation or partial combustion by detonation or treatment in a thermal plasma. Further, the carbon blacks may be employed in their normally fluffy form or, more conveniently in pelleted form. Also, it should be recognized that oxidative treatment of carbon blacks, particularly when carried out stringently, tends to increase the surface area of the black undergoing treatment. Accordingly, it is entirely possible to oxidatively treat a carbon black having a surface area substantially below the minimum required in the present invention (e.g. 150 m.$^2$/gram) in such a manner that the end product falls within both the surface area and volatile restrictions imposed hereinabove. The decolorization efficiencies of the carbon blacks employed in the present invention are all the more surprising in view of the fact that the classic method for "activation" of decolorizing carbons normally entails the heating thereof in an oxygen-free atmosphere.

The manner of contacting the dirty dry cleaning solvent with carbon black is generally not critical provided, of course, that the contact time between black and solvent is sufficient to result in the desired decolorization of the solvent. For instance, the contacting of the solvent with the black may be effected by slurrying the black with the solvent and subsequently filtering the decolorized solvent. More conveniently, however, the black will be retained in an enclosure adapted to allow solvent to pass therethrough while retaining the carbon black therein. In this latter case, of course, the carbon black comprises the filter bed media through which the solvent is passed at a rate sufficient to provide the desired decolorizing of the solvent.

The amount of black employed in order to effect the decolorizing process of the invention is also subject to wide variation. Ordinarily, however, the solvent will be contacted with an amount of black sufficient to provide at least about 0.05 gm. black/100 milliliters of the solvent. At concentrations substantially below 0.05 gm. black/100 milliliters of solvent the degree of decolorization of the solvent attainable is usually found to be impractically low. Preferably, the amount of black employed in any given case will fall between about 0.1 gm./100 ml. and about 1.0 gm./100 ml.

In another aspect of the invention we have further found that the decolorization efficiencies of the carbon blacks employed in the present invention are substantially enhanced when the dirty dry cleaning solvent to be treated comprises a minor amount of water dispersed or dissolved therein. The amount of water employed may be appropriately expressed in terms of the "solvent relative humidity" of the dry cleaning solvent and is determinable in accordance with the expression:

$$\text{Solvent relative humidity} = P_{H_2O}/P_{\circ H_2O}$$

where P is the partial pressure of water above the dry cleaning solvent and $P_o$ is the partial pressure of water alone, said partial pressure being taken at the same temperature, of course. The determination of these partial pressure may be determined manometrically. In any case, the preferred dry cleaning solvents for treatment by the process of the invention are those having sufficient water dissolved or dispersed therein to result in solvent relative humidities of above about 0.3. Of even further preference, the solvent relative humidity of the dry cleaning solvent to be treated with the carbon blacks defined in the instant invention will reside between about 0.6 and about 0.8. Another particularly surprising aspect of the invention resides in our discovery that the presence of water in the dry cleaning solvent ordinarily leads to degradation rather than improvement of relative decolorizing efficiencies when blacks are employed which fail to meet the minimum volatile content parameter described hereinabove.

In order to assure dispersal or dissolution of the water in the dry cleaning solvent, said solvent may comprise a minor amount of a suitable solvent soluble detergent, e.g. less than about 5 weight percent thereof. Classes of normally suitable solvent soluble detergents include: alkylaryl sulfonates, mahogany soaps, alkali metal sulfonic acid petroleum salts, dialkyl esters of sulfonated dicarboxylic acids, nonionic surfactants of the polyethenoxy family, etc.

There follows an illustrative, non-limiting example:

Example

Various sample carbon blacks are tested for dry cleaning solvent decolorization efficiency in the following manner:

The carbo black sample is dispersed in a standard dirty dry cleaning solvent having a solvent relative humidity ($H_2O$) of about 0.2. Said solvent additionally comprises about 1 wt. percent of a mahogany soap detergent. The dispersed black and solvent system is placed in a shaker tray and agitated continuously for about 24 hours at a temperature of about 80° F. The carbon black is then removed from the solvent by filtration and the filtrate is subject to spectrophotometric analysis at wavelength of 500 m$\mu$.

The test runs are then duplicated with the sole exception being that the dirty dry cleaning solvent batch employed as the test solvent is first treated by addition thereto of sufficient water to provide a solvent relative humidity of about 0.7.

In Table I following, the results of the spectrophotometric analyses are presented in terms of the relative decolorization efficiencies of the sample carbon blacks against solvent samples which had been decolorized in the same manner by treatment with Darco Premium, a lignite based steam activated char produced and marketed by Atlas Chemical Industries, Inc., Wilmington, Del.

TABLE I

| Run No. | Decolorizing agent | Percent volatile (ASTM D-1620-60) | BET-$N_2$ surface area, m.²/gram | Decolorizing agent concentration (gms./100 ml.) | Relative decolorizing efficiency (percent of control) Solvent relative humidity | |
|---|---|---|---|---|---|---|
| | | | | | 0.2 | 0.7 |
| 1 | Darco Premium Char (Control) | 4.6 | 550 | 0.45 | 100 | 100 |
| 2 | Oil Furnace Carbon Black (pellets) | 1.5 | 210 | 0.45 | 39 | 15 |
| 3 | Oil Furnace Carbon Black of Run No. 2 aftertreated by heating to about 350° F. in presence of aqueous $HNO_3$ (pellets). | 5.5 | 250 | 0.45 | 92 | 110 |
| 4 | Oil Furnace Carbon Black of Run No. 2 aftertreated by heating to about 750° F. in air (pellets). | 4.8 | 480 | 0.45 | 85 | 120 |
| 5 | Experimental Furnace Black (pellets) | 1.6 | 320 | 0.45 | 67 | 51 |
| 6 | Experimental Furnace Black of Run No. 5 aftertreated by heating to about 350° F. in presence of 4 wt. percent $NH_4NO_3$ (pellets). | 9.3 | 347 | 0.45 | 90 | 160 |
| 7 | Channel Black (fluffy) | 5.0 | 110 | 0.45 | 51 | 74 |
| 8 | do | 5.0 | 320 | 0.45 | 110 | 110 |
| 9 | Channel Black of Run No. 8 aftertreated by oxidation in the presence of air and $HNO_3$ vapors at about 325° F. | 16.0 | 510 | 0.45 | 150 | 210 |
| 10 | Experimental Furnace Black (fluffy) | 1.2 | 700 | 0.45 | 120 | 71 |
| 11 | Experimental Furnace Black of Run No. 1 (aftertreated by air oxidation at 750° F. (fluffy). | 8.5 | 730 | 0.45 | 160 | 240 |

What is claimed is:

1. A process for decolorizing dirty dry cleaning solvent compositions with comprises:
   (A) contacting a dry cleaning solvent composition comprising sufficient water dissolved or dispersed therein to provide a solvent relative water humidity of about 0.7 with at least about 0.05 gram per 100 milliliters thereof of an activated carbon black having a volatile content (ASTM D-1620-60) of between about 4.8 and about 16.0 weight percent and a BET-$N_2$ surface area of about 250 to about 730 m.²/gram; and
   (B) separating the carbon black from said dry cleaning solvent composition.

2. The process of claim 1 wherein the dry cleaning solvent is perchloroethylene.

3. The process of claim 1 wherein the amount of carbon black contacted with said dry cleaning solvent composition is between about 0.1 and about 1.0 gram per 100 milliliters thereof.

4. The process of claim 1 wherein said carbon black is in the form of pellets.

5. The process of claim 1 wherein said carbon black is a furnace carbon black.

6. The process of claim 1 wherein said dry cleaning solvent composition comprises less than about 5 percent by weight of the dry cleaning solvent of a solvent-soluble detergent.

References Cited

UNITED STATES PATENTS

| | | | |
|---|---|---|---|
| 2,420,810 | 5/1947 | Bray et al. | 23—209.1 |
| 2,707,674 | 5/1955 | Sweitzer | 252—444 X |
| 2,872,336 | 2/1959 | Weaver | 252—444 X |
| 3,231,324 | 1/1966 | Young | 210—39 X |
| 3,352,788 | 11/1967 | Conlisk | 210—39 X |
| 3,454,502 | 8/1969 | Hiltgen et al. | 210—39 X |

REUBEN FRIEDMAN, Primary Examiner

T. G. WYSE, Assistant Examiner

U.S. Cl. X.R.

252—445